(No Model.) 2 Sheets—Sheet 2.
A. F. NAGLE.
STEAM TRAP.
No. 533,999. Patented Feb. 12, 1895.
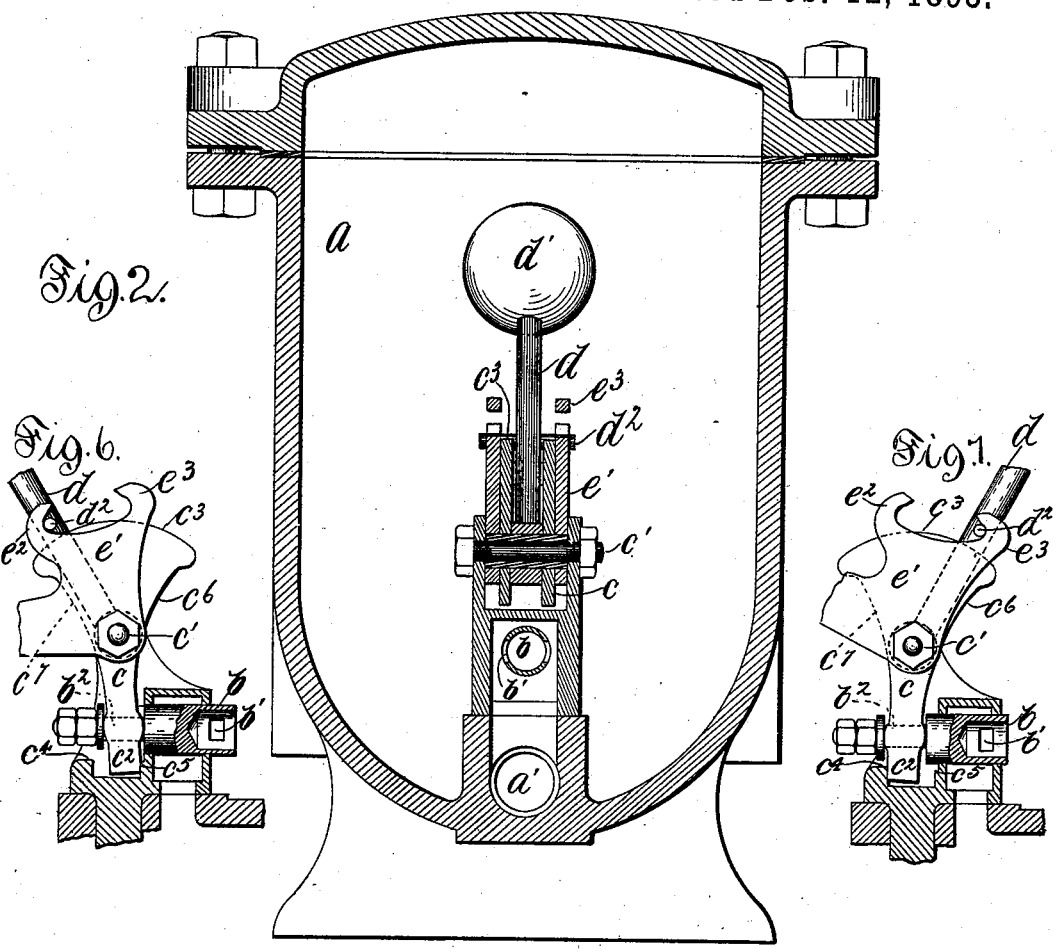
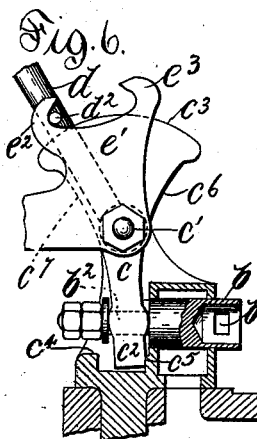
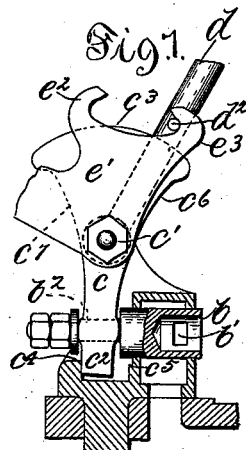
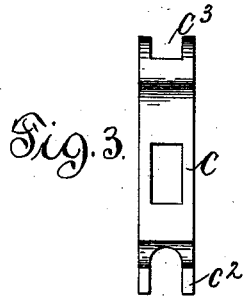
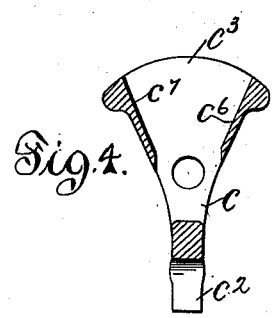
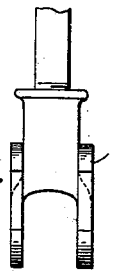
Witnesses:
George L. Cragg.
W. Clyde Jones.
Inventor
Augustus F. Nagle.
By Barton & Brown
Attorneys.

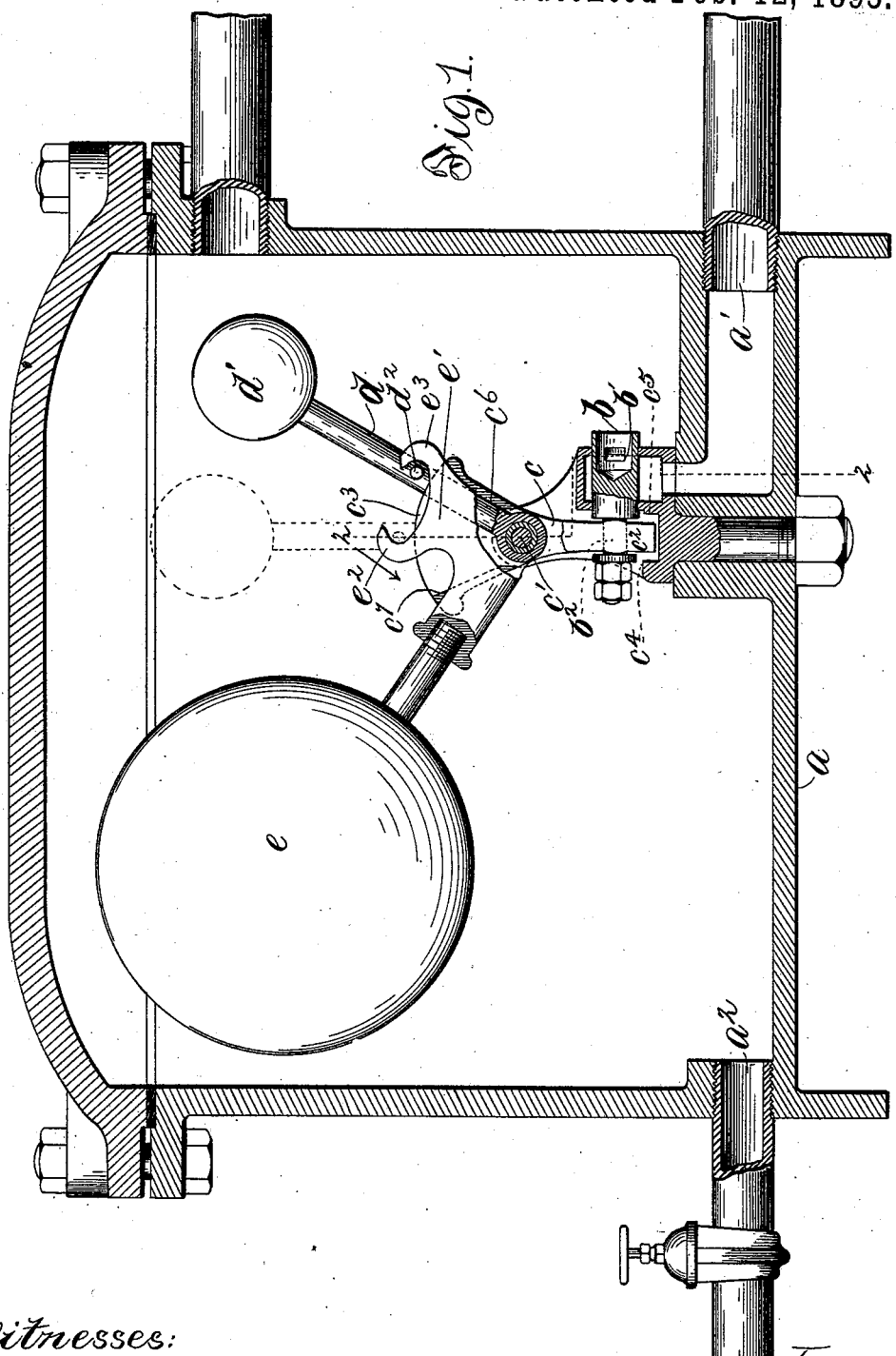

UNITED STATES PATENT OFFICE.

AUGUSTUS F. NAGLE, OF CHICAGO, ILLINOIS.

STEAM-TRAP.

SPECIFICATION forming part of Letters Patent No. 533,999, dated February 12, 1895.

Application filed September 10, 1894. Serial No. 522,659. (No model.)

*To all whom it may concern:*

Be it known that I, AUGUSTUS F. NAGLE, a citizen of the United States, residing at Chicago, in the county of Cook and State of Illinois, have invented a certain new and useful Improvement in Steam-Traps, of which the following is a full, clear, concise, and exact description, reference being had to the accompanying drawings, forming a part of this specification.

My invention relates to a steam trap, and its object is to provide mechanism operated by a float within the trap for opening and closing the valve that controls the discharge outlet, the valve controlling mechanism being directly connected with the valve and inclosed within the casing of the trap, whereby a self-controlled trap is produced.

My invention comprises a valve located in the lower end of the casing of the steam trap, and adapted to be moved back and forth by the impact of a falling weight, the movement of which is controlled by a float. The valve-controlling mechanism is inclosed within the casing, the trap being thus self-contained, and the necessity of carrying moving parts through the walls of the casing by stuffing boxes avoided. The falling weight is in the form of a weighted arm, pivoted at the lower end and adapted to be moved to a vertical position by the float, the arm then descending by its own weight and striking against a valve-shifting lever whose end engages the valve directly to oppose the same. The descent of the float serves to carry the weighted arm back to the vertical position and in its descent the arm impinges against the valve-shifting lever to close the valve. The valve-shifting mechanism is thus completely inclosed within the casing of the trap, and the trap is wholly self-contained.

Referring to the accompanying drawings, Figure 1 is a view in elevation, partly in section, of the valve mechanism embodying my invention. Fig. 2 is a sectional view on line 2—2, Fig. 1. Fig. 3 is a view of the valve-shifting lever. Fig. 4 is a sectional view thereof. Fig. 5 is a detached view of the pivoted member upon which the float is mounted. Fig. 6 shows the valve in its sealing position. Fig. 7 shows the valve in its discharge position.

Like letters refer to like parts in the several figures.

The steam trap $a$ is provided with an inlet $a'$, and a discharge outlet $a^2$. A piston valve $b$ normally seals the discharge outlet, and carries a port $b'$ which, when the valve is moved to the left affords a communication between the trap and the discharge outlet. A lever $c$ pivoted at $c'$ is provided with a bifurcated end $c^2$ adapted to engage the valve stem $b^2$ so that as the lever is rocked back and forth, movement is imparted to the valve. Stops $c^4 c^5$ are provided to limit the movement of said lever $c$. The upper arm $c^3$ of the lever is made hollow to accommodate an arm $d$ pivoted at $c'$ and carrying upon its end a weight $d'$. The float $e$ is mounted to rotate about the axis $c'$, and the member $e'$ on which it is mounted, carries lugs or projections $e^2 e^3$ adapted to engage a pin $d^2$ carried upon the arm $d$. When the valve occupies a position to the right, as shown in Fig. 6, the discharge outlet is sealed. As water accumulates in the trap, the float rises and the lug $e^2$ engages the pin $d^2$ on the arm $d$ and thus rotates the arm toward a vertical position. When the arm $d$ reaches the vertical position, any further rise of the float causes the lug $e^2$ to thrust arm $d$ beyond the vertical and the arm descends by its own weight to the position shown in Fig. 7, the arm striking the wall $c^6$ of the hollow end of the valve-shifting lever $c$ and suddenly thrusting the valve to the left to unseal the discharge outlet. As the water escapes the float descends and the lug $e^3$, coming in contact with the pin $d^2$, gradually moves the weighted arm toward the vertical, after passing which the arm descends, striking the wall $c^7$ of the hollow end of the valve-shifting lever $c$ and suddenly moving valve $b$ to the right to seal the discharge outlet.

Having described my invention, what I claim as new, and desire to secure by Letters Patent, is—

In a steam trap, the combination with a valve situated in the lower end of the trap and adapted to be moved to open and close the discharge outlet, of a valve-shifting lever centrally pivoted, engaging by its lower end the stem of said valve, and carrying lugs or walls at its upper end, a weighted arm pivoted at its lower end and adapted to vibrate between the lugs or walls upon said valve-shifting lever and to impinge against the same to open and close the valve, and a float mounted upon a pivoted arm, said arm being provided with lugs or projections adapted as the float rises and falls to engage said weighted arm and move the same to a position where it may descend of its own weight, said valve-shifting lever, weighted arm and float carrying arm being entirely inclosed within the casing of the trap, whereby a directly connected valve operating mechanism and a self-contained trap results; substantially as described.

In witness whereof I hereunto subscribe my name this 4th day of September, A. D. 1894.

AUGUSTUS F. NAGLE.

Witnesses:
W. CLYDE JONES,
GEORGE L. CRAGG.